United States Patent [19]

Ryoke et al.

[11] Patent Number: 5,063,105

[45] Date of Patent: Nov. 5, 1991

[54] MAGNETIC RECORDING MEDIUM IN WHICH CERTAIN PHYSICAL PROPERTIES OF THE MAGNETIC LAYER AND THE BACKCOAT LAYER ARE SPECIFIED

[75] Inventors: Katsumi Ryoke; Masatoshi Takahashi; Yasuo Nishikawa, all of Kanagawa, Japan

[73] Assignee: Fuji Photo Film Co., Ltd., Kanagawa, Japan

[21] Appl. No.: 466,547

[22] Filed: Jan. 17, 1990

[30] Foreign Application Priority Data

Jan. 17, 1989 [JP] Japan .................................. 1-005902
Mar. 6, 1989 [JP] Japan .................................. 1-53450

[51] Int. Cl.$^5$ .............................................. G11B 23/00
[52] U.S. Cl. ..................................... 428/336; 428/409; 428/422.8; 428/424.6; 428/694; 428/900
[58] Field of Search ............... 428/900, 694, 409, 336, 428/422.8, 424.6

[56] References Cited

U.S. PATENT DOCUMENTS 4,555,443 11/1985 Kikugawa et al. ................. 428/336
4,649,072 3/1987 Ryoke et al. ........................ 428/212
4,684,572 8/1987 Yasufuku et al. ................... 428/323

FOREIGN PATENT DOCUMENTS 60-66319 4/1985 Japan .

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium comprising a nonmagnetic support having formed thereon a magnetic layer containing a ferromagnetic fine powder, a binder, and carbon black and formed on the opposite side of the nonmagnetic support to the magnetic layer-carrying side a backing layer containing a binder and carbon black, wherein (i) the Young's modulus of the magnetic layer is from 600 to 1100 kg/mm$^2$ and the Young's modulus of the backing layer is from 200 to 400 kg/mm$^2$, or (ii) the surface free energy of the backing layer is at least 1 dyn/cm higher than the surface free energy of the magnetic layer, the gloss of the magnetic layer is at least 150, and the gloss of the backing layer is from 2 to 7.

8 Claims, No Drawings

5,063,105

MAGNETIC RECORDING MEDIUM IN WHICH CERTAIN PHYSICAL PROPERTIES OF THE MAGNETIC LAYER AND THE BACKCOAT LAYER ARE SPECIFIED

FIELD OF THE INVENTION

This invention relates to a magnetic recording medium comprising a non-magnetic support having thereon a magnetic layer and a backing layer formed on the opposite side of the support to the magnetic layer side, and more particularly to a magnetic recording medium excellent in storage aptitude.

BACKGROUND OF THE INVENTION

In general, as magnetic recording media for audio, video, computer (disks or memory tapes), etc., a magnetic recording medium having on a non-magnetic support a magnetic layer composed of a ferromagnetic fine powder dispersed in a binder has been used.

Recently, these magnetic recording media have been required for high density recording. Increase of S/N (signal/noise) and the reduction of noise have been attained by fining the size of a ferromagnetic fine powder, the employment of a ferromagnetic alloy powder, increased packed density of a ferromagnetic powder, and providing a very smooth surface of a magnetic recording medium.

Also, for performing high density recording without increasing time, it is necessary to quicken the recording (writing) speed to a magnetic recording medium or the reading speed from the magnetic recording medium and thus it has been required to run the magnetic recording medium at a high speed. For the high-speed running aptitude, the improvement of the running property, the antistatic characteristics, and the head cleaning characteristics of the magnetic recording medium must be considered and for such purposes, fillers such as carbon black and abrasives having a Moh's hardness of 8 or higher are used as disclosed in JP-A-59-193533, JP-A-59-186125, JP-A-59-191133, JP-A-58-189831, JP-A-59-63029, etc. (The term "JP-A" as used herein means an "unexamined published Japanese patent application").

Another problem of magnetic recording media is whether or not they can stably store magnetic records over several tens of years.

The problem of the stable storage aptitude in a magnetic recording medium is mainly summarized into the following three points.

That is, the 1st point is to restrain the change of the magnetic characteristics of a ferromagnetic fine powder being used, that is, to restrain the reduction of the magnetic characteristics of a ferromagnetic alloy powder by rust or the reduction of the magnetic characteristics of a Co-containing γ-iron oxide powder by the change of the distribution of Co and $Fe^{++}$ in the iron oxide grains.

The 2nd point is to restrain the deterioration of a binder being used. It is known that a coated layer of a binder is generally deteriorated by ultraviolet rays, temperature, and humidity (see, for example, E. F. Cuddhy, *IEEE Trans. Mag.*, Mag 16, 4, 558(July, 1980). It is also known that a vinyl chloride-vinyl acetate copolymer resin and a cellolose series resin slowly deteriorate as compared to a polyurethane resin and are each used in an amount of from 10 to 60% by weight of whole binders for a magnetic recording medium.

The 3rd point is to restrain the increase of drop out in a magnetic recording medium. A drop out of a magnetic recording medium is generally increased by an internal cause of the magnetic recording medium itself and an external cause by external dust.

The drop out by the internal cause is caused by the formation of foreign matter from a magnetic recording medium and these foreign matters cause not only drop out but also clogging of a magnetic head gap and causing spacing loss to make difficult the reproduction of the magnetically recorded signals.

Many causes are known for the formation of this foreign matter and they have been investigated. Examples of such foreign matters are certain kinds of fatty acids, certain kinds of fatty acid esters, oligomers from polymer supports, inorganic salts, etc.

It is considered that the drop out by the external cause is a spacing loss caused by attaching of dust particles (hereinafter "dust") existing in the air to the surface layer of a magnetic recording medium by electrostatic attraction. For avoiding the generation of static electricity on the surface of a magnetic recording medium, a method of reducing the surface electric resistance of a magnetic recording medium is known and for that purpose, it is known to apply carbon black or an antistatic agent to the inside of the layer(s) constituting the magnetic recording medium or onto the layer(s) thereof.

However, it is very difficult to effectively restrain the occurrence of drop out by the external cause of dust by these conventional techniques. The reason is considered to be that even if the electrostatic attraction of dust onto a magnetic recording medium is restrained, a magnetic recording medium exists in a dust-existing circumstance in the air and a magnetic recording medium has a high possibility of being exposed to dust. When a magnetic recording medium is exposed to a dust-existing circumstance during production, dust inevitably attaches to the magnetic recording medium during rolling or winding of the magnetic recording medium upon itself to cause drop out.

Various investigations have hitherto been made for reducing the occurrence of drop out. For example, JP-A-61-85620 proposes the formation of a backing layer containing a polyurethane resin, a vinylidenechloride-acrylonitrile copolymer (e.g., Saran®), and a polyisocyanate compound together with fine carbon black grains having a mean grain size of from 30 to 150 mμ and coarse carbon black grains having a mean grain size of from 160 to 600 mμ at a definite ratio as non-magnetic powders. By the aforesaid technique, the occurrences of the increase of the friction coefficient and scraping of the magnetic layer are inhibited, the occurrence of drop out caused by the aforesaid occurrences can be reduced and thus the S/N characteristics can be improved. However, even in such case, it has been found that a further improvement is required for inhibiting the occurrence of drop out under severe conditions of 200 passes.

Also, JP-A-58-91528, JP-A 59-58629, JP-A-60-66319, and JP-A-61-16022 propose the use of the magnetic layer or backing layer having a specific Young's modulus.

Furthermore, JP-A-58-91528 also discloses a method of improving the mechanical strength of a magnetic recording medium having a whole thickness of not more than 17 μm by employing the magnetic layer and the backing layer each having a Young's modulus of at least 1200 kg/mm² in the total of the longitudinal direction and the width direction. Also, in the examples thereof, the Young's modulus of the backing layer in the longitudinal direction is considerably high as from 650 to 850 kg/mm$^2$ and in such a magnetic recording medium, it was very difficult to restrain the occurrence of drop out by dust as the external cause. That is, since the backing layer had a considerably high Young's modulus, when the backing layer was superposed on the magnetic layer during rolling or winding the magnetic recording medium, dust existed at the interface of the layers to cause drop out.

JP-A-59-58629 proposes a method of inhibiting scraping off a high elastic modulus backing layer and preventing dust falling from the backing layer by forming a subbing layer of an electric modulus of lower than 10$^9$ dyn/cm$^2$ between the support and the backing layer having an elastic modulus of over 10$^9$ dyn/cm$^2$. However, even in this technique, it was very difficult to restrain the occurrence of drop out by dust as the external cause.

JP-A-60-66319 describes that by forming a backing layer having a Young's modulus of from 200 to 1,500 kg/mm$^2$ (preferably from 400 to 1,500 kg/mm$^2$), the durability of the magnetic recording medium is increased owing to the increased toughness of the backing layer and also the occurrence of scraping of the backing layer is inhibited. However, even with that technique, it is very difficult to restrain the occurrence of drop out by dust as the external cause.

Also, JP-A-61-16022 discloses that the running inferiority of a magnetic recording medium caused by the transfer of the unevenness of the backing layer onto the magnetic layer is improved by employing the backing layer having a Young's modulus of less than $5 \times 10^9$ dyn/cm$^2$. However, even by that technique, it is very difficult to restrain the occurrence of drop out by dust as the external cause.

Accordingly, it has been strongly desired to develop a magnetic recording medium having an excellent storage stability aptitude with reduced drop out caused by dust, etc., as the external cause.

SUMMARY OF THE INVENTION

An object of this invention is to provide a magnetic recording medium having excellent storage aptitude without causing the increase of drop out by clearly defining the Young's modulus or the surface free energy of each layer constituting the magnetic recording medium.

Furthermore, another object of this invention is to provide a magnetic recording medium having excellent video sensitivity and RF output by clearly defining the Young's modulus of each layer constituting the magnetic recording medium.

Also, a particular object of this invention is to provide a magnetic recording medium excellent in restraining increase of drop out in relationship to storage aptitude.

The present inventors have discovered that a remarkable effect for improving the storage aptitude of a magnetic recording medium is obtained by clarifying the causal relation between the mechanism of the occurrence of drop out and dust in the air, which was not known, and have thereby succeeded in completing the present invention.

That is, the aforesaid objects can be attained by the invention as described hereinbelow.

According to this invention, there is provided a magnetic recording medium comprising a non-magnetic support having formed thereon a magnetic layer containing a ferromagnetic fine powder, a binder, and carbon black and also having formed on the opposite side of the non-magnetic support to the magnetic layer-carrying side a backing layer containing a binder and carbon black, wherein (i) the Young's modulus of the magnetic layer is from 600 to 1100 kg/mm$^2$ and the Young's modulus of the backing layer is from 200 to 400 kg/mm$^2$, or (ii) the surface free energy of the backing layer is at least 1 dyn/cm larger than the surface free energy of the magnetic layer, the gloss of the magnetic layer is at least 150, and the gloss of the backing layer is from 2 to 7.

In addition, preferred embodiments of the magnetic recording medium of this invention are as follows.

In the aforesaid case (i):

(1) The magnetic recording medium, wherein the surface electric resistance of the magnetic layer is not higher than $5 \times 10^{10}$ Ω/cm$^2$ and the surface electric resistance of the backing layer is not higher than $1 \times 10^5$ Ω/cm$^2$.

(2) The magnetic recording medium, wherein when the thickness of the magnetic layer is A and the thickness of the backing layer is B, $$2.5 \leq (A/B) \leq 4.5$$

and $$3 \,\mu m \leq (A+B) \leq 9 \,\mu m.$$

(3) The magnetic recording medium, wherein when the thickness of magnetic layer is A, the thickness of the backing layer is B, and the thickness of the mon-magnetic support is C, $$(A+B) \leq C/2.$$

In the case of aforesaid (ii):

(4) The magnetic recording medium, wherein the surface free energy of the magnetic layer is from 40 to 55 dyn/cm, the surface electric resistance of the magnetic layer is not higher than $5 \times 10^{10}$ Ω/cm$^2$, the surface free energy of the backing layer is from 45 to 60 dyn/cm and the surface electric resistance of the backing layer is not higher than $1 \times 10^5$ Ω/cm$^2$.

DETAILED DESCRIPTION OF THE INVENTION

First, the magnetic recording medium of this invention satisfying the aforesaid feature (i) is described.

The magnetic recording medium having the feature (i) is a magnetic recording medium comprising a non-magnetic support having formed thereon a magnetic layer containing a ferromagnetic fine powder, a binder, and carbon black and formed on the opposite side of the non-magnetic support a backing layer containing a binder and carbon black, wherein the Young's modulus of the magnetic layer is controlled to the range of from 600 to 1100 kg/mm$^2$ and the Young's modulus of the backing layer is controlled to the range of from 200 to 400 kg/mm$^2$, thereby the occurrence of drop out is reduced and the video sensitivity and the RF output of the magnetic recording medium are improved.

Furthermore, in a preferred embodiment of the magnetic recording medium of this invention having the feature (i), the surface electric resistance of the magnetic layer is not higher than $5 \times 10^{10}$ $\Omega$/cm$^2$ and the surface electric resistance of the backing layer is not higher than $1 \times 10^5$ $\Omega$/cm$^2$, whereby the effects of reducing the occurrence of drop out and the improvements of the video sensitivity and the RF output are more improved.

Still further, in another preferred embodiment of the magnetic recording medium of this invention having the feature (i), the thickness A of the magnetic layer and the thickness B of the backing layer are controlled to $2.5 \leq (A/B) \leq 4.5$ and $3$ $\mu m \leq (A+B) \leq 9$ $\mu m$, whereby the aforesaid effects (i.e., the reduction of the occurrence of drop out and the improvements of the video sensitivity and the RF output) by the employment of the aforesaid Young's moduli of the magnetic layer and the backing layer are more effectively obtained.

Also, in still another preferred embodiment of the magnetic recording medium having the feature (i), the thickness A of the magnetic layer, the thickness B of the backing layer, and the thickness C of the non-magnetic support are controlled to $(A+B) \leq C/2$, whereby the aforesaid effects by the employment of the Young's moduli of both the layers can be also effectively obtained.

The reason that the aforesaid effects of this invention are obtained by employing the magnetic layer and the backing layer as described above is that when the magnetic layer is superposed upon the backing layer at rolling the magnetic recording medium, dust existing at the interface between the magnetic layer and the backing layer embed in the backing layer since the backing layer is relatively soft, thereby the transfer of the dust onto the magnetic layer is avoided. On the other hand, when the Young's modulus of the backing layer is high as from 650 to 850 kg/mm$^2$ and, thus, the backing layer has a same hardness as the magnetic layer as in JP-A-58-91528, dust at the interface do not embed in the backing layer and are evenly transferred onto the magnetic layer and the backing layer. Thus, it is considered that in the latter case, many occurrences of drop out occur.

As described above, the magnetic recording medium of this invention has a fundamental structure that a magnetic layer containing a ferromagnetic fine powder, a binder and carbon black is formed on a non-magnetic support and a backing layer containing a binder and non-magnetic particles is formed at the opposite surface of the non-magnetic support to the magnetic layer-carrying side. The magnetic layer can contain, if desired, an abrasive and a lubricant.

The present inventors, having investigated magnetic recording medium having a storage aptitude for reducing the occurrence of drop out and having excellent video sensitivity and RF output and as the result thereof, have found that in a magnetic recording medium comprising a non-magnetic support having formed thereon a magnetic layer containing a ferromagnetic fine powder, a binder and carbon black and having formed on the opposite side of the support to the magnetic layer side a backing layer containing a binder and carbon black, by controlling the Young's modulus of the magnetic layer to the range of from 600 to 1100 kg/mm$^2$ and Young's modulus of the backing layer to the range of from 200 to 400 kg/mm$^2$, the occurrence of drop out can be reduced and the video sensitivity and the RF output can be improved.

It has further been found that the aforesaid effects by employing the magnetic layer and the backing layer each having the Young's modulus defined above can be more improved by employing the preferred embodiments as described above.

When the Young's modulus of the magnetic layer is controlled to the range of from 600 to 1100 kg/mm$^2$ and the Young's modulus of the backing layer is controlled to the range of from 200 to 400 kg/mm$^2$ in the aforesaid magnetic recording medium according to this invention, dust, which causes drop out, existing between both the layers in a state of rolled magnetic recording medium embed in or are absorbed in the backing layer having the low Young's modulus and do not remain on the magnetic layer side, thereby the occurrence of drop out is reduced and the video sensitivity and the RF output of the magnetic recording medium can be improved as described above. The aforesaid feature of this invention is particularly effective for the inhibition of the occurrence of drop out in the case of storing the magnetic recording medium.

Furthermore, when the surface electric resistance of the magnetic layer is not higher than $5 \times 10^{10}$ $\Omega$/cm$^2$ and the surface electric resistance of the backing layer is not higher than $1 \times 10^5$ $\Omega$/cm$^2$ according to the aforementioned preferred embodiment of this invention, attaching of dust in the air onto the magnetic recording medium can be reduced and the combination of the aforesaid effect and the effect by the Young's modulus described above is particularly effective for the reduction of the occurrence of drop out and also can improve the video sensitivity and the RF output of the magnetic recording medium.

Still further, when the thickness A of the magnetic layer having the Young's modulus of from 600 to 1100 kg/mm$^2$ and the thickness B of the backing layer having the Young's modulus of from 200 to 400 kg/mm$^2$ are controlled to $2.5 \leq (A/B) \leq 4.5$ and $3$ $\mu m \leq (A+B) \leq 9$ $\mu m$ according to the aforesaid preferred embodiment, the occurrence of drop out is particularly effectively reduced. If A/B is less than 2.5, drop out by scraping of the backing layer is liable to increase and if A/B is over 4.5, the adsorbing effect of the backing layer for dust is reduced to increase the occurrence of drop out.

Moreover, when the aforesaid thickness A of the magnetic layer, the aforesaid thickness B of the backing layer, and the thickness C of the non-magnetic support are controlled to $(A+B) \leq C/2$ according to the aforesaid preferred embodiment of this invention, the aforesaid effect by the Young's modulus can be more improved.

In this invention, it is preferred that the Young's modulus of the non-magnetic support is from 400 to 800 kg/mm$^2$ and if $(A+B) > C/2$ in this case, the curvature of the magnetic recording tape is cupping, etc., is increased to cause the injury of the tape edges, which results in the occurrence of drop out.

In this invention, the Young's modulus (E) is obtained by the following equation;

$$E = \tan \alpha \text{ (kg/mm}^2\text{)}$$

wherein $\alpha$ is the inclination of the line at the initial portion of the stress-distortion curve. In this case, the drawing speed of the magnetic recording tape is from 5 to 80 mm/min. and the measuring condition is 23° C. and 50% RH.

Also, for the measurement of the Young's modulus, an oscillation type Young's modulus measuring device can be used and, for example, RHEO VIBRON (trade name, made by Orientec Co.) can be utilized. In this case, the measuring condition is also 23° C., 50% RH and the value of the Young's modulus is measured at an oscillation frequency of not higher than 11 Hz.

The Young's modulus in this invention is the value in the longitudinal direction of the coating treatment direction of the magnetic recording medium. The value of the Young's modulus in the width direction of the magnetic recording medium or the direction perpendicular to the coating direction of the magnetic recording medium is from 60% to 100% of the Young's modulus in the longitudinal direction.

Then, the magnetic recording medium of this invention having the aforesaid feature (ii) is explained.

In the magnetic recording medium of this invention, when the surface free energy of the magnetic layer is from 40 to 55 dyn/cm, the surface free energy of the backing layer is from 45 to 60 dyn/cm, and the surface free energy of the backing layer is at least 1 dyn/cm higher than the surface free energy of the magnetic layer, dust, which causes drop out, existing at the interface between the magnetic layer and the backing layer in a state of the rolled magnetic recording medium, is absorbed into the backing layer having the large surface free energy and thus do not remain at the magnetic layer side, whereby the occurrence of drop out is reduced, and also the video sensitivity and the RF output of the magnetic recording medium can be improved. The aforesaid feature of this invention is particularly effective for the reduction of the occurrence of drop out in the case of storing the magnetic recording medium.

Furthermore, when the surface electric resistance of the magnetic layer is not higher than $5 \times 10^{10}$ $\Omega/cm^2$ and the surface electric resistance of the backing layer is not higher than $1 \times 10^5$ $\Omega/cm^2$ in the aforesaid recording medium of this invention, attaching of dust existing in the air onto the magnetic recording medium can be reduced. The combination of the aforesaid effect and the effect by defining the surface free energies of the magnetic layer and the backing layer is particularly effective for the reduction of the occurrence of drop out with the improvement of the video sensitivity and the RF output of the magnetic recording medium.

Moreover, by controlling the gloss of the magnetic layer above 150 and the gloss of the backing layer to the range of from 2 to 7, the surface free energies of the magnetic layer and the backing layer can be stabilized with the reduction of the occurrence of drop out and the improvement of the video sensitivity and the RF output of the magnetic recording medium.

In the aforesaid magnetic recording medium, it is the necessary factors of this invention that the surface free energy of the backing layer is at least 1 dyn/cm higher than the surface free energy of the magnetic layer, the gloss of the magnetic layer is above 150, and the gloss of the backing layer is from 2 to 7, whereby the reduction of the occurrence of drop out and the improvement of the RF output become remarkable.

The surface free energy in the feature (ii) of this invention can be obtained from the contact angle of methylene iodide, ethylene glycol, or water according to the Fowkes's equation [F. M. Fowkes, *Journal of Physical Chemistry*, 66, 382(1962) and ibid., 67, 2583(1963)], the Owens's equation [D. K. Owens and R. C. Wendt, *Journal of Applied Polymer Science*, 13, 1741(1969) and ibid., 14, 1725(1970)] or the Hata's equation [Toshio Hata, *Kobunshi* (*High Polymers*), 17, 594(1968) and *Nippon Setchaku Kyokai Shi* (*Journal of The Adhesion Society of Japan*), 8, 131(1972)]. Also, the measuring means can be carried out by referring to *Nyumon Kobunshi Bussei* (*Introduction to High Polymer Properties*), pages 83–85, edited by High Polymer Society (published by Kyoritsu Shuppan K.K., 1985). The measurement condition of the contact angle is 23° C., 70% RH.

The surface free energy in this invention can be controlled by the composition for constituting the magnetic layer and the backing layer, the surface properties of both the layers, and the coating methods for the layers.

In the magnetic recording medium of this invention, the feature that the surface free energy of the magnetic layer is from 40 to 55 dyn/cm, the surface free energy of the backing layer is from 45 to 60 dyn/cm, and the surface free energy of the backing layer is at least 1 dyn/cm higher than the surface free energy of the magnetic layer can be practically attained by discriminating the critical surface tension of a binder for the one layer from the critical surface tension of a binder for the other layer. The values of critical surface tensions of various resins for binders are described in *Kagaku to Kogyo* (*Chemistry and Industry*), Vol. 32, 898(1979), Masanobu Motoyoshi, *Lubricities of and Lubricants for Plastics*, page 266, published by Nikkan Kogyo Shinbun Sha, 1977, and *Kagaku Binran* (*Chemical Handbook*) *Foundation II*, edited by Chemical Society of Japan, published by Maruzen, 1975.

Practical examples of the values of critical surface tensions are Teflon (18 dyn/cm) < silicon resin (24 dyn/cm) < polyethylene resin (31 dyn/cm) < vinyl chloride resin (39 dyn/cm) < Nylon 66 (46 dyn/cm).

Also, by introducing the following group into each of the aforesaid resins, the value of the critical surface tension of each resin is increased in the following order; —COO— < —OCOO— < —ONHCO—. Also, by introducing COOH, $SO_3H$, or a phosphoric acid group, etc., into each resin, the value of the critical surface tension of the resin is generally increased.

Accordingly, the feature of the magnetic recording medium of this invention that the surface free energy of the magnetic layer is from 40 to 55 dyn/cm and the surface free energy of the backing layer is from 45 to 60 dyn/cm can be attained by so designing that the critical surface tension of a resin for the magnetic layer becomes lower than the critical surface tension of a resin for the backing layer.

Practically, when a vinyl chloride resin and a polyurethane resin are used for the magnetic layer, the vinyl chloride resin is used for the backing layer in a proportion less than that in the magnetic layer and a resin having a higher critical surface tension than that of the vinyl chloride resin, such as a urethane resin or a nylon resin, is also used for the backing layer, or a similar composition as above is formed in the backing layer.

For controlling the gloss of the magnetic layer above 150 and the gloss of the backing layer to the range of from 2 to 7 in the magnetic recording medium of this invention, the magnetic recording medium is subjected to a super calender treatment after coating such that the magnetic layer and the backing layer thereof meet the aforesaid conditions. It is preferred that the super calender treatment is carried out at a temperature of from 70° to 120° C. and a line pressure of from 100 to 500 kg/cm. Also, it is preferred for making uniform the distribution of a lubricant in the surface portion of the magnetic layer that the temperature for the super calender treatment is not lower than the melting point of the lubricant used in the magnetic layer. Furthermore, it is preferred that the central line average surface roughness of the magnetic layer is from $0.5 \times 10^{-2}$ to $1.5 \times 10^{-2}$ μm at a cut off of 0.25 mm and that of the backing layer is from $3 \times 10^{-2}$ to $12 \times 10^{-2}$ μm when measured according to the method of JIS-B 0601-1982.

For meeting the aforesaid surface properties that the gloss of the magnetic layer of the magnetic recording medium is above 150 and the gloss of the backing layer is from 2 to 7, the shear rate being applied to the coating compositions directly before coating is at least 4,000/sec. and the viscosities of the coating compositions at the time are from 0.1 to 1 poise at 25° C. The relation of these factors is described in Temple C. Patton, *Paint Flow and Pigment Dispersion*, published by John Wiley and Sons, 1964.

The gloss value of the magnetic recording medium of this invention is the value of the specular gloss at a reflection angle of 45° to an incident angle of 45° according to JIS Z8741 and is the value shown by a relative value in the case of defining the specular gloss of a black glass having a refractive index of 1.567 as 100%. It is considered that the gloss value shows the fine surface roughness of the surface layers of the magnetic recording medium and in general, as the surface roughness of the surfaces of a magnetic recording medium becomes coarser, the surface free energy becomes higher and the surfaces are liable to be wetted. Also, as the surface thereof becomes smoother, the surface free energy thereof becomes lower and the surfaces become reluctant to be wetted.

In the magnetic recording medium of this invention, the magnetic layer having a Young's modulus of from 600 to 1100 kg/mm$^2$ contains a ferromagnetic fine powder, a binder, carbon black, and, if desired, an abrasive and a lubricant.

In the magnetic recording medium of this invention, it is preferred that the ratio of ferromagnetic fine powder/binder is from 100/18 to 100/40 by weight ratio.

Also, the binder for the magnetic layer of the magnetic recording medium of this invention is preferably composed of (1) a vinyl chloride resin and/or a vinyl chloride-vinyl acetate copolymer resin, (2) a polyurethane resin, and (3) polyisocyanate and the ratio (by weight percent) of these resins is 20 to 55:15 to 70:10 to 40, and preferably 20 to 50:20 to 70:10 to 40 in the case of the feature (i) and 45 to 55:15 to 25:20 to 35 in the case of the feature (ii).

In these cases, it is preferred that the Young's modulus of the vinyl chloride resin and/or the vinyl chloride-vinyl acetate copolymer resin being used for the magnetic layer is from 150 to 350 kg/mm$^2$ and the Young's modulus of the polyurethane resin is from 1 to 70 kg/mm$^2$. After dispersing a ferromagnetic fine powder to a mixture of the resin (1) and the resin (2), polyisocyanate is added thereto to control the Young's modulus of the coated layer of the magnetic layer to the range of from 600 to 1100 kg/mm$^2$.

In the magnetic recording medium of this invention, the backing layer having a Young's modulus of from 200 to 400 kg/mm$^2$ contains a binder, carbon black, and, if desired, other filler(s). In this case, it is preferred that the ratio of powders (carbon black and other filler(s))/binder is from 100/45 to 100/100 by weight ratio. Also, the binder for the backing layer is preferably composed of (1) a phenoxy resin and/or a phenol resin, (2) a polyurethane resin and/or an epoxy resin, and (3) polyisocyanate and it is preferred that the ratio of these resins is 20 to 50:40 to 70:10 to 40 by weight ratio.

In this case, it is preferred that the Young's modulus of the phenoxy resin and/or the phenol resin being used for the backing layer is from 150 to 350 kg/mm$^2$ and the Young's modulus of the polyurethane resin and/or the epoxy resin is from 1 to 70 kg/mm$^2$. After adding powders such as carbon black, etc., to the mixture of the resin (1) and the resin (2), polyisocyanate is added thereto to control the Young's modulus of the coated layer of the backing layer to the range of from 200 to 400 kg/mm$^2$.

For controlling the surface electric resistance of the magnetic layer to not higher than $5 \times 10^{10}$ Ω/cm$^2$, a proper amount of electrically conductive carbon black is added to the magnetic layer. For example, electrically conductive carbon black is added in an amount of from 0.5 to 8 parts by weight to 100 parts by weight of the ferromagnetic fine powder. When the ferromagnetic fine powder is a powder of iron oxide, the powder contains from 2 to 8 parts by weight of divalent iron.

For controlling the surface electric resistance of the backing layer not higher than $1 \times 10^5$ Ω/cm$^2$, the proportion of other filler(s) if any is less than 30 parts by weight per 100 parts by weight of carbon black.

As the ferromagnetic fine powder being used in this invention, there are $\gamma$-Fe$_2$O$_3$, Co-containing (coated, modified, or doped) $\gamma$-Fe$_2$O$_3$, Co-containing (coated, modified, or doped) Fe$_3$O$_4$, FeO$_x$, Co-containing (coated, modified, or doped) FeO$_x$ (wherein X is from 1.33 to 1.50), CrO$_2$, CrO$_2$ containing at least one of Rn, Te, Sb, Sr, Fe, Ti, V, Mn, and Cr$_2$O$_3$, Fe, Co, Ni, Fe-Co alloy, Fe-Ni alloy, Fe-Co-Ni alloy, Co-Ni-P alloy, Co-Ni-Fe-B alloy, Fe-Ni-Zn alloy, Ni-Co alloy, Co-Ni-Fe alloy, Fe-N alloy, Fe-Co-Cr alloy, Mn-Bi alloy, etc.

The ferromagnetic alloy powder can be prepared, for example, by the following methods.

(a) A method of reducing a composite organic acid salt (mainly an oxalate) with a reductive gas such as hydrogen, etc.

(b) A method of obtaining an Fe powder or an Fe-Co alloy powder by reducing iron oxide or iron oxide containing a Co compound with a reductive gas such as hydrogen, etc.:

(c) A method of thermally decomposing a metal carbonyl compound.

(d) A method of reducing a ferromagnetic metal by adding a reducing agent such as sodium borohydride, a hypophosphite, hydrazine, etc., to an aqueous solution of the ferromagnetic metal.

(e) A method of electrolytically depositing a ferromagnetic metal powder using a mercury cathode and separating mercury.

(f) A method of obtaining a fine metal powder by evaporating the metal in an inert gas at low pressure.

The particle sizes of these ferromagnetic powders are from about 0.005 μm to 1 μm and the ratio of axial length/axial width is from about 1/1 to 50/1. Also, the specific area of the ferromagnetic powder is from about 1 to 70 m$^2$/g. The water content of the ferromagnetic powder is from about 0.2 to 2.0% by weight. Also, the water content of the coating composition using the ferromagnetic powder is from 0.00 to 2.00% by weight. Furthermore, prior to dispersing the ferromagnetic powder, a dispersing agent, a lubricant, an antistatic agent, etc., may be adsorbed onto the surface of the ferromagnetic powder by impregnating the ferromagnetic powder with the agent in a solvent.

It is preferred that the ferromagnetic powder contains a heavy metal such as Sr, Pb, Mn, Ni, Cd, Cr, Al, Si, Ti, Cu, Zn, etc., in an amount of within 1% by weight. Also, the ferromagnetic powder may be coated with or welded with alumina, etc.

Also, as a ferromagnetic powder for the magnetic recording medium of this invention, tabular hexagonal barium ferrite can be used. The diameter of barium ferrite is from about 0.001 to 1 μm and the thickness thereof is from ½ to 1/20 of the diameter. The specific gravity of barium ferrite is from 4 to 6 g/cc and the specific surface area thereof is from 1 to 70 m2/g. A dispersing agent, a lubricant, an antistatic agent, etc., may be also adsorbed onto the surface of the barium ferrite powder by impregnating the powder with the agent in a solvent as will be described latter.

In this invention, the effects of this invention become remarkable in the case of using a ferromagnetic alloy powder containing iron, cobalt or nickel and having a specific surface area of at least 35 $m^22/g$.

As specific examples of the aforesaid ferromagnetic alloy powder, there are a ferromagnetic alloy powder wherein the content of a metal in the ferromagnetic alloy powder is at least 75% by weight, at least 80% by weight of the metal is at least one of ferromagnetic metals or alloys (e.g., Fe, Co, Ni, Fe-Co, Fe-Ni, Co-Ni, and Co-Ni-Fe) and at most 20% by weight of the metal is other component(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, and P) and an iron nitride powder.

Also, the aforesaid ferromagnetic alloy powder may contain a small amount of water, a hydroxide, or an oxide.

The production methods for the aforesaid ferromagnetic metal or alloy powder are known and the ferromagnetic alloy powder being used in this invention as the specific examples thereof can be produced according to known methods.

In the case of using the ferromagnetic alloy powder, there is no particular restriction on the form thereof but an acicular powder, a granular powder, a cubic powder, a rice grain form powder, or a tabular powder can be usually used.

The specific surface area ($S_{BET}$) of the ferromagnetic alloy powder is preferably at least 40 $m^2/g$, and particularly preferably at least 45 $m^2/g$.

As the binders being used for the magnetic layer and the backing layer in this invention, conventionally known thermoplastic resins, thermosetting resins, reactive resins, and a mixture of them are used.

The thermoplastic resin being used in this invention has a softening temperature of not higher than 150° C., an average molecular weight of from 10,000 to 3,000,000, and a polymerization degree of from about 50 to 2,000.

Examples of the thermoplastic resin are a vinyl chloride-vinyl acetate copolymer, a vinyl chloride copolymer, a vinyl chloride-vinylidene chloride copolymer, a vinyl chloride-acrylonitrile copolymer, an acrylic acid ester-acrylonitrile copolymer, an acrylic acid ester-vinylidene chloride copolymer, an acrylic acid ester-styrene copolymer, a methacyrlic acid ester-acrylonirtile copolymer, a methacyrlic acid ester-vinylidene chloride copolymer, a methacyrlic acid ester-styrene copolymer, a urethane elastomer, a nylon-silicon series resin, a nitrocellulose-polyamide resin, polyvinyl fluoride, a vinylidene chloride-acrylonitrile copolymer, a butadiene-acrylonitrile copolymer, a polyamide resin, polyvinyl butyral, cellulose derivatives (such as cellulose acetate butyrate, cellulose diacetate, cellulose triacetate, cellulose propionate, nitrocellulose, ethyl cellulose, methyl cellulose, propyl cellulose, methylethyl cellulose, carboxymethyl cellulose, and acetyl cellulose), a styrene-butadiene copolymer, a polyester resin, a chlorovinyl ether-acrylic acid ester copolymer, an amino resin, various synthetic rubber series thermoplastic resins, and mixtures thereof.

The thermosetting resin or the reactive resin being used in this invention has a molecular weight of not more than 200,000 in a state of the coating composition and by heating the coated composition after drying, the molecular weight thereof is unlimitedly increased by a condensation reaction, an addition reaction, etc. In these resins, the resin which is not softened or melted before being thermally decomposed is preferred.

Specific examples thereof are a phenol resin, a phenoxy resin, an epoxy resin, a polyurethane curing type resin, a urea resin, a melamine resin, an alkyd resin, a silicon resin, an acrylic reactive resin, an epoxy-polyamide resin, a nitrocellulose-melamine resin, a mixture of a high molecular weight polyester resin and an isocyanate prepolymer, a mixture of a methacrylate copolymer and a diisocyanate prepolymer, a mixture of a polyester polyol and polyisocyanate, a urea-formaldehyde resin, a mixture of a low molecular weight glycol, a high molecular weight glycol, and triphenylmethane triisocyanate, a polyamine resin, a polyimine resin, and mixtures of them.

These binders can be used singly or as a combination thereof and can contain additives.

In the mixing ratio of the ferromagnetic powder and the binder for the magnetic layer, the proportion of the binder is from 5 to 300 parts by weight, and preferably from 18 to 40 parts by weight per 100 parts by weight of the ferromagnetic powder. Also, in the mixing ratio of fine powder(s) and the binder for the backing layer, the proportion of the binder is from 30 to 300 parts by weight, and preferably from 45 to 100 parts by weight per 100 parts by weight of the powder(s).

To these mixtures are added, if desired, a dispersing agent, a lubricant, an abrasive, an antistatic agent, an antioxidant, a solvent, etc.

Each of these thermoplastic resins, thermosetting resins and reactive resins usually contain from 1 to 6 kinds of acid groups such as a carboxylic acid group, a sulfinic acid group, a sulfenic acid group, a sulfonic acid group, a phosphoric acid group, a sulfuric acid group, a phosphone group, a phosphine group, a boric acid group, a sulfuric acid ester group, a phosphoric acid ester group, and alkyl ester groups thereof (these acid groups may be in the form of sodium salts, etc.); amino acids; amphoteric groups such as aminosulfonic acids, sulfuric acid or phosphoric acid esters of aminoalcohols, alkylbetaine type groups, etc.; an amino group, an imino group, an imido group, an amido group, an epoxy group, a hydroxy group, an alkoxy group, a thiol group, a halogen atom, a silyl group, a siloxane group, etc., as functional group(s) in addition to a main functional group and the content of the functional group(s) is preferably from $1 \times 10^{-6}$ eq to $1 \times 10^{-2}$ eq per gram of the resin.

As a hardening agent for the binder being used in this invention, polyisocyanate is used and examples thereof are isocyanates such as tolylene diisocyanate, 4,4′-diphenylmethane diisocyanate, hexamethylene diisocyanate, xylylene diisocyanate, naphthylene-1,5-diisocyanate, o-toluidine isocyanate, isophorone diisocyanate, triphenylmethane triisocyanate, isophorone diisocyanate, etc.; reaction products of the aforesaid isocyanates and a polyalcohol; a dimer to a pentadecanomer, and preferably a dimer to a decanomer formed by the condensation of isocyanates.

The average molecular weight of the polyisocyanate being used in this invention is preferably from 100 to 20,000.

Some of these polyisocyanates are commercially available as Coronate L, Coronate HL, Coronate 2030, Coronate 2031, Millionate MR, Millionate MTL (Coronate and Millionate: trade names by Nippon Polyurethane K.K.), Takenate D-102, Takenate D-110N, Takenate D-200, Takenate D-202, Takenate 300S, Takenate 500 (Takenate: trade name by Takeda Chemical Industries, Ltd.), Sumidur T-80, Sumidur 44S, Sumidur PF, Sumidur L, Sumidur N, Desmodule L, Desmodule IL, Desmodule N, Desmodule HL, Desmodule T65, Desmodule 15, Desmodule R, Desmodule RF, Desmodule SL, and Desmodule Z4273 (Sumidur and Desmodule: trade names by Sumitomo Bayer Co., Ltd.). They can be used singly or as a combination thereof utilizing the difference in curing reactivity of them.

Also, for accelerating the curing reaction of the polyisocyantes, a compound having a hydroxy group (e.g., butanediol, hexanediol, polyurethane having a molecular weight of from 1,000 to 10,000, and water) or an amino group (e.g., monomethylamine, dimethylamine, and trimethylamine) or a metal oxide can be used as a catalyst. It is preferred that the compound having a hydroxy group or an amino group is polyfunctional.

The aforesaid polyisocyanate is used in an amount of from 5 to 40% by weight of the total amount of the binders.

As the dispersing agent for use in this invention, there are fatty acids having from 10 to 26 carbon atoms ($R_1COOH$, wherein $R_1$ is an alkyl group having from 9 to 25 carbon atoms), such as caprylic acid, capric acid, lauric acid, myristic acid, palmitic acid, stearic acid, behenic acid, oleic acid, elaidic acid, linolic acid, linolenic acid, stearolic acid, etc.; metal salts composed of the alakali metal (Li, Na, K, etc.) or $NH^{4+}$ salts, alkaline earth metal (Mg, Ca, Ba, etc.) salts, Cu salts, or Pb salts of the aforesaid fatty acids; fatty acid amides of the aforesaid fatty acids; lecithin, etc.

Other examples of the dispersing agent for use in this invention are higher alcohols having 4 or more carbon atoms (e.g., butanol, octyl alcohol, myristyl alcohol, and stearyl alcohol) and the sulfuric acid esters, phosphoric acid esters, and amine compounds of these higher alcohols. Also, polyalkylene oxides and the sulfuric acid esters, phosphoric acid esters, and amine compounds of the polyalkylene oxides or sulfosuccinic acid, sulfosuccinic acid ester, etc., can be used as the dispersing agent.

For changing the compatibility of the aforesaid compounds with a binder or the properties of these compounds, a substituent such as Si and F can be introduced therein.

The dispersing agents are usually used singly or as a mixture thereof and when one kind of a dispersing agent is used, the amount thereof is from 0.005 to 20 parts by weight per 100 parts by weight of the binder.

The dispersing agent may be applied to the surface of the ferromagnetic powder or the non-magnetic powders or may be added to the coating composition during the dispersing of the powder.

Other examples of a preferred dispersing agent are surface active agents such as carboxylic acids, phosphoric acid esters, etc., and fluorine series surface active agents, such as Fluorad FC95, FC129, FC 430, and FC431 (trade name, made by 3M).

As the lubricant and antioxidant which are used for the magnetic layer and the backing layer in this invention, there are inorganic fine powders such as molybdenum disulfide, boron nitride, fluorinated graphite, calcium carbonate, barium sulfate, silicon oxide, titanium oxide, zinc oxide, tin oxide, tungsten disulfide, etc., an acrylstyrene series resin fine powder, a benzoguanamine series rein fine powder, melamine series resin fine powder, a polyolefin series resin fine powder, a polyester series resin fine powder, a polyamide series resin fine powder, a polyimide series resin fine powder, a polyethylene fluoride series resin fine powder, a silicone oil, a fatty acid-modified silicone oil, graphite, fluorine alcohol, polyolefin (e.g., polyethylene wax, etc.), polyglycol (e.g., polyethylene oxide wax, etc.), tetrafluoroethylene oxide wax, polytetrafluoroglycol, perfluorofatty acid, a perfluorofatty acid ester, a perfluoroalkylsulfuric acid ester, a perfluoroalkylphosphoric acid ester, an alkylphosphoric acid ester, a polyphenyl ether, fatty acid esters of monobasic fatty acids having from 10 to 20 carbon atoms and at least one of a monohydric alcohol having from 3 to 12 carbon atoms, a dihydric alcohol, a trihydric alcohol, a tetrahydric alcohol, and a hexahydric alcohol, and fatty acid esters of monobasic fatty acids having at least 10 carbon atoms and a monohydric to hexhydric alcohol giving from 11 to 28 carbon atoms (sum of the carbon atoms of the fatty acid and the carbon atoms of the alcohol).

Also, fatty acids having from 8 to 22 carbon atoms, fatty acid amides, and aliphatic alcohols can be used as an organic lubricant.

Specific examples of these organic lubricants are butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, anhydrosorbitan ethylene oxide monostearate, oleyl oleate, oleyl alcohol, lauryl alcohol, etc., and they can be used singly or as a combination thereof.

Also, as the lubricant for use in this invention, so-called lubricant oils can be used singly or as a combination with one of antioxidants (alkylphenol, etc.), rust preventing agents (naphthenic acid, alkenyl-succinic acid, dilauryl phosphate, etc.), oily agents (rapeseed oil, lauryl alcohol, etc.), extreme pressure agents (dibenzyl sulfide, tricresyl phosphate, tributyl phosphate, etc.), cleaning dispersing agents, viscosity index improving agent, pour point depressants, defoaming agents, etc.

The aforesaid lubricant is added to the binder in an amount of from 0.05 to 2 parts by weight per 100 parts by weight of the binder.

Also, as the antioxidant for use in this invention, there are heterocyclic compounds such as benzotriazine, benzothiazole, benzodiazine, EDTA (ethylenediaminetetra-acetic acid), etc.

As the antistatic agent for use in this invention, there are electrically conductive powders such as graphite, carbon black, carbon black graft polymers, tin oxide-antimony oxide, tin oxide, titanium oxide-tin oxide-antimony oxide, etc.; natural surface active agents such as saponin, etc.; nonionic surface active agents such as alkylene oxide series surfactants, glycerol series surfactants, glycidol series surfactants, polyhydric alcohols, polyhydric alcohol esters, alkylphenol-ethylene oxide addition products, etc.; cationic surface active agents such as higher alkylamines, cyclic amines, hydantoin derivatives, amidoamines, ester amides, quaternary ammonium salts, heterocyclic compounds (such as pyridine, etc.), phosphoniums, sulfoniums, etc.; anionic surface active agents having an acid group such as carboxylic acid, sulfonic acid, phosphoric acid, a sulfuric acid ester group, a phosphoric acid ester group, etc.; and amphoteric surface active agents such as amino acids, aminosulfonic acids, sulfuric acid or phosphoric acid esters of amino alcohol, alkylbetaine type surfactants, etc.

These surface active agents may be added singly or as a mixture of them.

Also, the surface active agent may be coated on the surface of the magnetic recording medium at from 1 mg/mm$^2$ to 550 mg/m$^2$.

The amount of the surface active agent is from 0.01 to 10 parts by weight per 100 parts by weight of the ferromagnetic fine powder.

The aforesaid compounds are used as antistatic agents but are, sometimes, used for other purposes such as the improvement of the dispersibility and the magnetic characteristics, the improvement of the lubricity, and as a coating aid.

As carbon black for use in this invention, there are rubber furnace black, rubber thermal black, color black, acetylene black, etc.

Specific examples of these carbon blacks (as the abbreviations in the United States) are SAF, ISAF, IISAF, T, HAF, SPF, FF, FEF, HMF, GPF, APF, SRF, MPF, ECF, SCF, CF, FT, MT, HCC, HCF, MCF, LFF, RCF, etc., which are classified in ASTM D-1765-82a.

The average particle size of carbon black for use in this invention is from 5 to 1,000 mµ (electron microscope), the specific surface area thereof by a nitrogen adsorption method is from 1 to 1,500 m$^2$/g, pH thereof is from 2 to 13 (by the method of JIS K-6221-1982), and the dibutyl phthalate (DBP) oil absorption thereof is from 5 to 2,000 ml/100 g (by the method of JIS K-6221-1982). The water content of carbon black for use in this invention is from 0.00 to 20% by weight.

In this invention, for the purpose of reducing the surface electric resistance of the coated layer, carbon black having sizes of from 5 to 100 mµ is used and for the purpose of controlling the strength of the coated layer, carbon black having sizes of from 50 to 1,000 mµ is used.

Also, for smoothing the surface of the coated layer for reducing the spacing loss, fine grain carbon black (less than 100 mµ) can be used and for reducing the friction coefficient of the coated layer by roughening the surface, coarse grain carbon black (not less than 100 mµ) can be used.

As described above, the kind and the addition amount of carbon black are selected according to the purposes required for the magnetic recording medium.

Also, carbon black for use in this invention may be surface-treated by the aforesaid dispersing agent or may be grafted with a resin. Also, carbon black a part of the surface of which has been converted into graphite by treating the carbon black produced in a furnace at a temperature above 2,000° C. can be used. Also, as specific carbon black, hollow carbon black can be used in this invention.

It is preferred that in the case of the magnetic layer, carbon black is used in an amount of from 0.1 to 20 parts by weight per 100 parts by weight of the ferromagnetic powder. On carbon black which can be used in this invention and properties of carbon black, the descriptions of, e.g., *Carbon Black Binran* (*Handbook*), edited by Carbon Black Association, published 1971 can be referred to.

As the abrasives being used for the magnetic layer and the backing layer in this invention, materials having an abrasing action or a polishing action and mainly having a Moh's hardness of at least 6, and preferably at least 8, such as α-alumina, γ-alumina, α-γ-alumina, fused alumina, silicon carbide, chromium oxide, cerium oxide, corundum, artificial diamond, α-iron oxide, garnet, emery (main components: corundum and magnetite), silica, silicon nitride, boron nitride, molybdenum carbide, tungsten carbide, titanium carbide, quartz, tripoli, diatomaceous earth, dolomite, etc., can be used singly or as a combination of 2 to 4 kinds thereof.

The average grain size of the abrasives is from 0.005 to 5 µm, and preferably from 0.01 to 2 µm. The abrasive is used in the range of from 0.01 to 20 parts by weight per 100 parts by weight of the binder.

As organic solvents which are used at the dispersion, kneading, and coating of the coating compositions, there are ketones such as acetone, methyl ethyl ketone, methyl isobutyl ketone, cyclohexanone, isophorone, tetrahydrofuran, etc.; alcohols such as methanol, ethanol, propanol, butanol, isobutyl alcohol, isopropyl alcohol, methyl cyclohexanol, etc.; esters such as methyl acetate, ethyl acetate, butyl acetate, isobutyl acetate, isopropyl acetate, ethyl lactate, acetic acid glycol monoethyl ether, etc.; ethers such as diethyl ether, tetrahydrofuran, glycol dimethyl ether, glycol monoethyl ether, dioxane, etc.; tary aromatic hydrocarbons such as benzene, toluene, xylene, cresol, chlorobenzene, styrene, etc.; chlorinated hydrocarbons such as methylene chloride, ethylene chloride, carbon tetrachloride, chloroform, ethylene chlorohydrin, dichlorobenzene, etc.; N,N-dimethylformaldehyde, hexane, etc.

There is no particular restriction on the manner of kneading of the aforesaid components and the addition orders of these components can be properly selected.

For the preparations of the coating compositions for the magnetic layer and the backing layer, a two-roll mill, a three-roll mill, a ball mill, a pebble mill, a trommel, a sand ginder, Szegvari, an attritor, a high-speed impeller, a dispersing device, a high-speed stone mill, a disper, a kneader, an intensive mixer, a tumbler, a blender, a ribbon blender, a co-kneader, a high-speed impact mill, a dispenser, a homogenizer, a single axis screw extruder, a two-axis screw extruder, and a ultrasonic dispersing device can be selectively used.

Details of the technique on kneading and dispersing are described in T. C. Patton, *Paint Flow and Pigment Dispersion*, published by John Wiley & Sons, 1964 and Shinichi Tanaka, *Kogyo Zairyo* (*Industrial Materials*), Vol. 25, 37(1977) and for continuous coating, the kneading and dispersing devices described above are used in a proper combination thereof. Also, devices described in U.S Pat. Nos. 2,581,414 and 2,855,156 can be used.

In this invention, the components are kneaded and dispersed according to the methods described in the aforesaid publications or the literatures cited therein to prepare the coating compositions for the magnetic layer and the backing layer.

The magnetic layer in this invention is formed by dissolving or dispersing the aforesaid components in an organic solvent and coating the coating composition thus prepared on a non-magnetic support followed by drying.

When the magnetic recording medium of this invention is used as a magnetic recording tape, the thickness of the support is from about 2.5 to 100 μm, and preferably from about 3 to 70 μm. When the magnetic recording medium of this invention is used as a floppy disk or a card, the thickness of the support is from 0.03 to 10 mm. Also, as the case may be, the support can be used as a cylindrical drum.

As the materials for the non-magnetic support for use in this invention, there are polyesters such as polyethylene terephthalate, polyethylene naphthalate, etc.; polyolefins such as polypropylene, polyethylene, etc.; cellulose derivatives such as cellulose triacetate, cellulose diacetate, etc.; vinyl resins such as poly-vinyl chloride, polyvinlydene chloride, etc.; plastics such as polycarbonate, polyamide, polysulfone, etc.; as well as metals such as aluminum, copper, etc., and ceramics, such as glass, etc.

Before coating, the non-magnetic support may be subjected to a corona discharging treatment, a plasma treatment, a subbing treatment, a heat treatment, a dust removing treatment, a metal vapor deposition treatment, or an alkali treatment.

The coating compositions for the magnetic layer and the backing layer are coated on the non-magnetic support by air doctor coating, blade coating, air knife coating, squeeze coating, dip coating, reverse roll coating, transfer roll coating, gravure coating, kiss coating, cast coating, spray coating, bar coating, etc. These are practically described in *Coating Engineering*, pages 253–277, published by Asakura Shoten, 1971.

After coating the magnetic layer on the support, a treatment of orienting the ferromagnetic powder in the layer to a desired direction is applied thereto while drying the layer and then the magnetic layer formed is dried. In this case, the traveling speed of the support is usually from 10 m/min. to 1,000 m/min, and the drying temperature is from 20° C. to 130° C.

In the present invention, the backing layer is coated on a support before or after coating a magnetic layer continuously or discontinuously, and then dried. The surface smoothing treatment for the backing layer may be conducted continuously or discontinuously provided that the treatment is a step after coating and drying the magnetic layer.

The magnetic recording medium thus prepared is, if necessary, subjected to a surface smoothing treatment and cut into a desired form.

In the production method of the magnetic recording medium, it is preferred to continuously perform the surface treatment of filler, kneading and dispersing the components, coating the coating compositions, the heat treatment, calender treatment, EB (Electro Beam) treatment, surface polishing treatment, and cutting. Also, if necessary, the aforesaid steps may be separately carried out.

In these steps, the temperature is controlled to the range of from 10° C. to 130° C. and the humidity is controlled to the range of from 5 g/kg (dry air) to 20 g/kg (dry air).

The invention is described more practically by the following examples but it will be understood that the components, the component ratios, and the operations shown therein can be changed with in the scope of this invention. In addition, the parts in the examples are by weight.

EXAMPLE 1

The following components of composition [I] for a magnetic layer were sufficiently kneaded, and after adding thereto the following components of composition [II], the mixture was sufficiently kneaded, and then the following components of composition [III] were dispersed in the mixture to provide a magnetic coating composition.

| Composition [I] | |
|---|---|
| Co-containing γ-$Fe_2O_3$ powder (Nitrogen adsorption specific area: 45 $m^2$/g, Hc: 900 Oe) | 300 parts |
| Vinyl chloride resin (containing $SO_3H$ and epoxy group, MR110, trade name, made by Nippon Zeon Co.) | 40 parts |
| Polyurethane resin (CRISVON 7209, trade name, made by Dainippon Ink and Chemicals, Inc.) | 10 parts |
| Carbon black (Vulcan XC72, trade name, made by Cabot Co., mean grain size: 30 mμ) | 12 parts |
| Abrasive: α-$Al_2O_3$ (HIT100, trade name, made by Sumitomo Chemical Company, Ltd.) | 18 parts |
| Abrasive: $Cr_2O_3$ (SI, trade name, made by Nippon Kagaku Kogyo K. K., mean grain size: 0.1 μm) | 3 parts |
| Oleic Acid | 3 parts |
| Cyclohexanone | 150 parts |
| Composition [II] | |
| Polyurethane resin (Nippollan N2304, trade name, made by Nippon Polyurethane Co.) | 8 parts |
| Butyl acetate | 850 parts |
| Tert-butyl stearate | 3 parts |
| Composition [III] | |
| Polyisocyanate (Coronate 3040, trade name, made by Bayer) | 24 parts |
| Stearic acid | 3 parts |
| Butyl acetate | 100 parts |

After controlling the viscosity of the magnetic coating composition, the coating composition was coated on a polyethylene terephthalate film of 19 μm in thickness at a dry thickness of 5.0 μm, and after subjecting it to a magnetic field orientation by a magnet of 3000 gauss, the coated layer was dried and calendered to form a magnetic layer.

Then, the backing layer coating composition shown below was coated on the back side of the non-magnetic support having the magnetic layer at a dry thickness of 2.0 μm. The backing layer coating composition was prepared by kneading the following backing layer composition [I] by a ball mill and mixing the composition with the following composition [II].

| Composition [I] | |
|---|---|
| Carbon black (Raven MTP, made by Cabot Co., nitrogen adsorption specific area: 10 $m^2$/g, mean grain size: 250 mμ) | 80 parts |
| Carbon black (Conductex SC, trade name, made by Columbia Co., Ltd., nitrogen adsorption specific | 20 parts |

-continued

| | |
|---|---|
| area: 200 m²/g, mean grain size: 20 mμ) | |
| Polyurethane polycarbonate resin (FJ2, trade name, made by Dainichiseika Color & Chemicals, Inc.) | 35 parts |
| Phenoxy resin (PKHH, trade name, made by Union Carbide Co.) | 10 parts |
| Copper oleate | 0.1 part |
| Methyl ethyl ketone | 700 parts |
| Cyclohexanone | 300 parts |
| Composition [II] | |
| Polyisocyanate (Coronate 2061, made by Nippon Polyurethane Co.) | 5 parts |
| Lubricant (silicone KF69, trade name, made by Shin-Etsu Chemical Co., Ltd.) | 0.1 part |
| Lubricant (oleic acid) | 1 part |
| Methyl ethyl ketone | 100 parts |

Thereafter, the magnetic recording tape thus prepared was cut into a width of 1 inch to provide a video tape sample.

EXAMPLE 2

By following the same procedure as Example 1 except that the binder for the magnetic layer was changed as shown in Table 1 below, a video tape sample was also prepared.

EXAMPLE 3

By following the same procedure as Example 1 except that the binder for the magnetic layer was changed as shown in Table 1 below, a video tape sample was prepared.

EXAMPLE 4

By following the same procedure as Example 2 except that the amounts of the polyurethane polycarbonate resin and the phenoxy resin for the backing layer were changed to 40 parts and 5 parts, respectively, a video tape sample was prepared.

EXAMPLE 5

By following the same procedure as Example 2 except that the amounts of the polyurethane polycarbonate resin and the phenoxy resin for the backing layer were changed to 30 parts and 15 parts, respectively a video tape sample was prepared.

COMPARISON EXAMPLE 1

By following the same procedure as Example 1 except that the amounts of polyisocyanate for the magnetic layer was changed from 24 parts to 5 parts, a video tape sample was prepared.

COMPARISON EXAMPLE 2

By following the same procedure as Example 1 except that 40 parts of the vinyl chloride resin (MR110) and 10 parts of the polyurethane resin (CRISVON 7209) for the magnetic layer were changed to 60 parts of the vinyl chloride resin (MR110), a video tape sample was prepared.

COMPARISON EXAMPLE 3

By following the same procedure as Example 2 except that 10 parts of the phenoxy resin (PKHH) for the backing layer was changed to 20 parts of the vinyl chloride resin (MR110), a video tape sample was prepared.

COMPARISON EXAMPLE 4

By following the same procedure as Example 2 except that 10 parts of the phenoxy resin (PKHH) for the backing layer was changed to 40 parts of the vinyl chloride resin (MR110), a video tape sample was prepared.

COMPARISON EXAMPLE 5

By following the same procedure as Example 2 except that the amounts of the polyurethane polycarbonate resin and the phenoxy resin for the backing layer were changed to 45 parts and 0 part, respectively, a video tape sample was prepared.

COMPARISON EXAMPLE 6

By following the same procedure as Example 1 of JP-A-58-91528, a video tape sample was prepared.

That is, a coating composition for a magnetic layer, having the following composition was coated on one side of a polyester base film which had Young's moduli of 750 Kg/mm² in the longitudinal derection and 350 Kg/mm² in the width direction so that a dry thickness of the coating composition was 4 μm. Then, the coating composition was dried to form a magnetic layer.

Then, the backing layer coating composition shown below was coated on the back side of the polyester base film having the magnetic layer at a dry thickness of 1 μm. Thereafter, the magnetic recording tape thus prepared was cut into a predetermined width to provide a video tape sample.

The thus obtained magnetic tape had Young's moduli of 800 Kg/mm² in the longitudinal direction and 500 Kg/mm² in the width direction (1300 Kg/mm² in total), for the magnetic layer, and 700 Kg/mm² in the longitudinal direction and 650 Kg/mm² in the width direction (1350 Kg/mm² in total), for the backing layer.

| | |
|---|---|
| Magnetic layer coating composition | |
| Co-containing needle-like γ-Fe₂O₃ powder | 100 parts |
| Carbon black | 4 parts |
| Nitro cellulose | 10 parts |
| Polyurethane resin | 9 parts |
| Desmodule L (Isocyanate compound made by Bayer Co.) | 3.5 parts |
| Stearic acid-n-butyl | 0.5 part |
| Myristic acid | 0.5 part |
| Cyclohexanone | 95 parts |
| Toluene | 95 parts |
| Backing layer coating composition | |
| Needle-like α-Fe₂O₃ powder | 75 parts |
| Carbon black | 15 parts |
| Nitro cellulose | 50 parts |
| Polyurethane resin | 35 parts |
| Desmodule L | 15 parts |
| Myristic acid | 0.5 part |
| Stearic acid-n-butyl | 0.5 part |
| Cyclohexanone | 230 parts |
| Toluene | 230 parts |

EVALUATION METHOD

Drop out (D.O.)

After measuring drop out (initial value) on each of the samples thus prepared by a video tape recorder, BVH 500 (made by Sony Corporation) at 23° C., 50% RH, each sample was run repeatedly (100 passes), the sample was stored for one week at 40° C., 80% RH, and after changing the condition to 23° C., 50% RH, drop out was measured again (time passed value). Thus, from the difference between the time passed value and the initial value per one minute, the increase of drop out was determined.

RF Output

The RF outputs before and after the aforesaid test (before storing and after storing) were measured, whereby the change of the RF output after storing to the RF output before storing (relative value) was determined.

The results obtained are shown in Table 1 below.

the magnetic layer was changed to 24 parts, a video tape sample was prepared.

EXAMPLE 7

By following the same procedure as Example 6 except that the ferromagnetic fine powder in the magnetic layer (i.e., Co-containing $\gamma$-$Fe_2O_3$ powder) was changed to a ferromagnetic fine powder containing divalent iron in an amount of 8 atom % to that amount of the trivalent iron, a video tape sample was prepared.

TABLE 1-1

| | Magnetic Layer | | | Back Layer | | |
|---|---|---|---|---|---|---|
| | Vinyl Chloride Resin (parts) | Polyurethane Resin (parts) *1 | Polyurethane Resin (parts) *2 | Poly-isocyanate (parts) | Polyurethane Polycarbonate Resin (parts) | Phenoxy Resin (parts) | Vinyl Chloride Resin (parts) |
| Example 1 | 40 | 10 | 8 | 24 | 35 | 10 | — |
| Example 2 | 30 | 13 | 10 | 29 | 35 | 10 | — |
| Example 3 | 50 | 20 | 15 | 15 | 35 | 10 | — |
| Example 4 | 30 | 13 | 10 | 29 | 40 | 5 | — |
| Example 5 | 30 | 13 | 10 | 29 | 30 | 15 | — |
| Comparison Example 1 | 40 | 10 | 8 | 5 | 35 | 10 | — |
| Comparison Example 2 | 60 | — | 8 | 24 | 35 | 10 | — |
| Comparison Example 3 | 30 | 13 | 10 | 29 | 35 | — | 20 |
| Comparison Example 4 | 30 | 13 | 10 | 29 | 35 | — | 40 |
| Comparison Example 5 | 30 | 13 | 10 | 29 | 45 | 0 | — |
| Comparison Example 6 | Same as Example 1 of JP-A-58-91528 | | | | | | |

*1: CRISVON 7209
*2: Nippollan N2304

TABLE 1-2

| | Young's Modulus ($Kg/mm^2$) | | Surface Electric Resistance ($\Omega/cm^2$) | | Drop Out (5 $\mu$sec, −16 dB) | RF Output (dB) |
|---|---|---|---|---|---|---|
| | Magnetic Layer | Back Layer | Magnetic Layer | Back Layer | | |
| Example 1 | 600 | 350 | $5 \times 10^9$ | $5 \times 10^4$ | 80 | 0 |
| Example 2 | 800 | 350 | $5 \times 10^9$ | $5 \times 10^4$ | 70 | 0 |
| Example 3 | 1100 | 350 | $5 \times 10^9$ | $5 \times 10^4$ | 90 | 0 |
| Example 4 | 800 | 200 | $5 \times 10^9$ | $5 \times 10^4$ | 70 | 0 |
| Example 5 | 800 | 400 | $5 \times 10^9$ | $5 \times 10^4$ | 95 | 0 |
| Comparison Example 1 | 400 | 350 | $5 \times 10^9$ | $5 \times 10^4$ | 190 | −0.3 |
| Comparison Example 2 | 1300 | 350 | $5 \times 10^9$ | $5 \times 10^4$ | 200 | −0.8 |
| Comparison Example 3 | 800 | 600 | $5 \times 10^9$ | $5 \times 10^4$ | 200 | −0.5 |
| Comparison Example 4 | 800 | 800 | $5 \times 10^9$ | $5 \times 10^4$ | 250 | −1.0 |
| Comparison Example 5 | 800 | 100 | $5 \times 10^9$ | $5 \times 10^4$ | 250 | −0.4 |
| Comparison Example 6 | 800 | 700 | $1 \times 10^9$ | $5 \times 10^{10}$ | 300< | −0.3 |

As is clear from the results shown in Table 1, the magnetic recording media of this invention show less occurrence of drop out by storing and excellent RF output characteristics. On the other hand, the samples of Comparison Examples 1 to 6 are inferior in the above results and the reason is considered to be that the Young's moduli of the coated layers are unsuitable.

EXAMPLE 6

By following the same procedure as Example 1 except that the amount of carbon black (Vulcan XC72) for

EXAMPLE 8

By following the same procedure as Example 1 except that the amounts of carbon black (Raven MTP) and carbon black (Conductex SC) for the backing layer were changed to 104 parts and 26 parts, respectively, a video tape sample was prepared.

On each of the samples thus prepared, drop out and the RF output were measured by the evaluation methods as in Example 1 and the results obtained are shown in Table 2 below.

TABLE 2

| | Magnetic Layer | | | Backing Layer | | Young Modulus (Kg/mm²) | | Surface Electric Resistance (Ω/cm²) | | Drop Out (5 μsec, −16 dB) | RF Output (dB) |
|---|---|---|---|---|---|---|---|---|---|---|---|
| | Carbon Black *1 (parts) | Ferromagnetic Fine Powder (parts) | | Carbon Black (parts) | | Magnetic Layer | Backing Layer | Magnetic Layer | Backing Layer | | |
| | | *2 | *3 | *4 | *5 | | | | | | |
| Example 1 | 12 | 300 | — | 80 | 20 | 600 | 350 | $5 \times 10^9$ | $5 \times 10^4$ | 80 | 0 |
| Example 6 | 24 | 300 | — | 80 | 20 | 650 | 350 | $1 \times 10^9$ | $5 \times 10^4$ | 75 | 0 |
| Example 7 | 24 | — | 300 | 80 | 20 | 600 | 350 | $5 \times 10^8$ | $5 \times 10^4$ | 65 | 0 |
| Example 8 | 12 | 300 | — | 104 | 26 | 600 | 320 | $5 \times 10^9$ | $1 \times 10^4$ | 65 | 0 |

*1: Carbon Black; Vulcan X C 72
*2: Ferromagnetic Fine Powder; Co-containing $\gamma$-Fe$_2$O$_3$ powder (FE++ = 0 atom %)
*3: Ferromagnetic Fine Powder; Co-containing $\gamma$-Fe$_2$O$_3$ powder (Fe++ = 8 atom %)
*4: Carbon Black; Raven MTP
*5: Carbon Black; Conductex SC As is clear from the results shown in Table 2, the samples of this invention show less occurrence of drop out by storing and excellent RF output characteristics.

EXAMPLES 9 TO 12

By following the same procedure as Example 1 except that the dry thickness (A) of the magnetic layer, the dry thickness (B) of the backing layer, and the thickness (C) of the non-magnetic support were changed as shown in Table 3 below, video tape samples were prepared.

On each of the samples prepared, drop out and the RF output were measured by the same methods as in Example 1 and the results are shown in Table 3 below.

TABLE 3

| | Dry Thickness of Magnetic Layer (A) (μm) | Dry Thickness of Backing Layer (B) (μm) | Thickness of Non-Magnetic Support (C) (μm) | A/B | (C/2) − (A + B) | Drop Out (5 μsec, −16 dB) | RF Output (dB) |
|---|---|---|---|---|---|---|---|
| Example 1 | 5.0 | 2.0 | 19.0 | 2.5 | 2.5 | 80 | 0 |
| Example 9 | 5.0 | 1.5 | 19.0 | 3.3 | 3.0 | 90 | 0 |
| Example 10 | 6.0 | 1.5 | 16.0 | 4.0 | 0.5 | 90 | 0 |
| Example 11 | 7.0 | 2.0 | 19.0 | 3.5 | 0.5 | 75 | 0 |
| Example 12 | 5.0 | 2.0 | 14.5 | 2.5 | 0.25 | 95 | 0 |

As is clear from the results shown in Table 3, the samples of the examples of this invention show less occurrence of drop out and excellent RF output characteristics.

EXAMPLE 13

The following composition [I] for the magnetic layer was sufficiently kneaded in a kneader, and after adding thereto the following composition [II] followed by sufficient kneading, the following composition [III] was dispersed therein to provide a magnetic coating composition.

| Composition [I] | |
|---|---|
| Co-Containing $\gamma$-Fe$_2$O$_3$ powder (nitrogen adsorption specific area: 45 m²/g, Hc: 900 Oe) | 300 parts |
| Vinyl chloride resin (containing SO$_3$H and epoxy group, MR110, trade name, made by Nippon Zeon K. K.) | 38 parts |
| Polyurethane resin (CRISVON 7209, trade name, made by Dainippon Ink and Chemicals, Inc.) | 18 parts |
| Carbon black (Vulcan XC72, trade name, made by Cabot Co., mean grain size: 30 mμ) | 12 parts |
| Abrasive: $\alpha$-Al$_2$O$_3$ (HIT100, trade name, made by Sumitomo Chemical Company, Limited) | 18 parts |
| Abrasive: Cr$_2$O$_3$: (S1, trade name made by Nippon Kagaku Kogyo KK, mean grain size: 0.1 μm) | 3 parts |
| Oleic acid | 3 parts |
| Cyclohexanone | 150 parts |
| Composition [II] | |
| Butyl acetate | 850 parts |
| Tert-butyl myristate | 3 parts |
| Composition [III] | |
| Polyisocyanate (Coronate 3040, trade name, made by Bayer A. G.) | 21 parts |
| Stearic acid | 3 parts |
| Butyl acetate | 100 parts |

After controlling the viscosity of the magnetic coating composition, the composition was coated on a polyethylene terephthalate film of 19 μm in thickness at a dry thickness of 5.0 μm and after subjecting a magnetic orientation by a magnet of 3,000 gausses, the coated layer was dried and subjected to a calender treatment under the condition of 90° C. and 300 kg/cm in line pressure to form a magnetic layer.

Then, the following composition [I] for the backing layer was kneaded in a ball mill and after adding thereto the following composition [II] followed by mixing to provide a coating composition for the backing layer. The coating composition was coated on the back side of the aforesaid non-magnetic support having the magnetic layer at a dry thickness of 2.0 μm to form a backing layer.

| Composition [I] | |
|---|---|
| Carbon black (MTCI, nitrogen adsorp- | 85 parts |

| | |
|---|---|
| tion specific area: 10 m²/g, mean grain size: 250 mμ, made by Sevalco Co.) | |
| Carbon black (Conductex SC, nitrogen adsorption specific area: 200 m²/g, mean grain size: 20 mμ, made by Columbia Co.) | 15 parts |
| Polyurethane polycarbonate resin (FJ2, trade name, made by Dainichiseika Color & Chemicals Mfg. Co. Ltd.) | 35 parts |
| Phenoxy resin (PKHH, trade name, made by Union Carbide Co.) | 10 parts |
| Copper oleate | 0.1 part |
| Methyl ethyl ketone | 700 parts |
| Cyclohexanone | 300 parts |
| Composition [II] | |
| Polyisocyanate (Coronate 3040, trade name, made by Nippon Polyurethane Co.) | 10 parts |
| Lubricant (silicone, KF69, trade name, made by Shin-Etsu Chemical Co., Ltd.) | 0.1 part |
| Lubricant (oleic acid) | 1 part |
| Methyl ethyl ketone | 100 parts |

The magnetic recording medium thus prepared was cut into a width of one inch to provide a video tape sample.

EXAMPLE 14

By following the same procedure as Example 13 except that the binder (A) for the backing layer (i.e., phenoxy resin) was changed to a vinyl chloride-vinyl acetate resin (400X110A, trade name, made by Nippon Zeon Co., Ltd.) as shown in Table 4 below, a video tape sample was prepared.

EXAMPLE 15

By following the same procedure as Example 13 except that the binder for the backing layer was changed to a composition composed of 5 parts of a vinyl chloride resin (containing $SO_3H$ and epoxy group, MR110, trade name, made by Nippon Zeon Co., Ltd.), 14 parts of a polyurethane resin (CRISVON 7209, trade name, made by Dainippon Ink and Chemicals, Inc.), and 7 parts of polyisocyanate (Coronate 3040, trade name, made by Nippon Polyurethane Co.), a video tape sample was prepared.

COMPARISON EXAMPLE 7

After kneading the following composition for 48 hours in a ball mill, 10 parts of a polyisocyanate compound (Coronate L-75, trade name, made by Nippon Polyurethane Co.) was added thereto followed by kneading for further one hour. Thereafter, the kneaded mixture was filtered by a filter having a mean pore size of 1 μm to provide a coating composition for a magnetic layer.

| | |
|---|---|
| Co-Containing γ-$Fe_2O_3$ powder (specific surface area by BET method: 35 m²/g, Hc: 650 Oe) | 100 parts |
| Vinyl chloride-vinyl acetate-maleic anhydride copolymer (MRR-TM, trade name, made by Nisshin Kagaku K. K.) | 15 parts |
| Nitrocellulose | 5 parts |
| Polyurethane resin (CRISVON 6119, trade name, made by Dainippon Ink and Chemicals, Inc.) | 3 parts |
| Carbon black (20 mμ) | 3 parts |
| Chromium oxide | 3 parts |
| Oleic acid | 2 parts |
| Butyl stearate | 1 part |
| Stearic acid | 0.5 part |
| Fatty acid-modified silicone | 2 parts |
| Oleic acid amide | 0.5 part |
| Butyl acetate | 240 parts |
| Methyl ethyl ketone | 120 parts |

The aforesaid coating composition for magnetic layer was coated on a polyethylene terephthalate film of 20 μm in thickness by a reverse roll at a dry thickness of 6 μm and dried.

After kneading the following composition for backing layer for 70 hours by a ball mill, 15 parts of a polyisocyanate compound (Coronate L75, trade name, made by Nippon Polyurethane Co.) was added thereto and the mixture was kneaded further for one hour. Thereafter, the kneaded mixture was filtered by a filter having a mean pore size of 3 μm to provide a coating composition for backing layer. The coating composition was coated on the back side of the aforesaid polyethylene terephthalate film having the magnetic layer by a reverse roll at a dry thickness of 2 μm and dried.

| | |
|---|---|
| Carbon black (mean grain size: 90 mμ) | 25 parts |
| Carbon black (mean grain size: 300 mμ) | 25 parts |
| Talc (made by Nippon Talc K. K.) | 50 parts |
| Polyurethane resin (Nippollan-2304, trade name, made by Nippon Polyurethane Co.) | 27 parts |
| Saran resin (F-310, trade name, made by Asahi Dow Co.) | 32 parts |
| Oleic acid | 0.5 part |
| Oleic acid amide | 0.5 part |
| Methyl ethyl ketone | 500 parts |
| Butyl acetate | 100 parts |
| Cyclohexane | 40 parts |

The magnetic recording tape thus prepared was treated by super calender rolls and cut into a width of one inch to provide a sample.

The surface free energies of the magnetic layer and the backing layer of the samples thus prepared in Examples 13-15 and Comparison Example 7 were measured using a Perkin-Elmer goniometer at 23° C. 70% RH, according to the method described in *Nyumon Kobunshi Bussei* (*Introduction to High Polymer Properties*), pages 84-85, published by Kyoritsu Shuppan K.K., 1985) and the contact angles were measured by the Fowkes's equation on water, methylene iodide, and ethylene glycol.

COMPARISON EXAMPLE 8

By following the same procedure as Example 15 except that the amounts of the binders for the backing layer was changed as shown in Table 4 below, a sample was prepared.

COMPARISON EXAMPLE 9

By following the same procedure as Example 13 except that the super calender condition was changed from 90° C. and 300 kg/cm in line pressure to 65° C., 300 kg/cm in line pressure, a sample was prepared.

On these samples, drop out and the RF output were measured by the same manners as described in Example 1 except that 100 passes repeated running for the drop out measurement was changed to 200 passes repeated running and the results obtained are shown in Table 4.

TABLE 4

|  | Binder (A) (parts) |  | Binder (B) (parts) |  | Polyisocyanate (parts) | Surface Free Energy of Magnetic Layer (dyn/cm) | Surface Free Energy of Backing Layer (dyn/cm) |
| --- | --- | --- | --- | --- | --- | --- | --- |
| Example 13 | Phenoxy Resin | 10 | Polycarbonate Polyurethane Resin | 35 | 10 | 50 | 55 |
| Example 14 | Vinyl Chloride-Vinyl Acetate Resin | 20 | Polycarbonate Polyurethane Resin | 30 | 5 | 50 | 54 |
| Example 15 | Vinyl Chloride Resin (containing SO$_3$H, epoxy group) | 5 | Polyurethane Resin | 14 | 7 | 50 | 52 |
| Comparison Example 7 | Saran Resin | 32 | Polyurethane Resin | 27 | 15 | 47 | 46 |
| Comparison Example 8 | Vinyl Chloride Resin (containing SO$_3$H, epoxy group) | 20 | Polyurethane Resin | 6 | 7 | 50 | 46 |
| Comparison Example 9 | Phenoxy Resin | 10 | Polycarbonate Polyurethane Resin | 35 | 10 | 48 | 52 |

|  | Surface Electric Resistance of Magnetic Layer ($\Omega$/cm$^2$) | Surface Electric Resistance of Backing Layer ($\Omega$/cm$^2$) | Gloss of Magnetic Layer | Gloss of Backing Layer | Drop out (5 $\mu$sec, $-16$ dB) | RF Output (dB) |
| --- | --- | --- | --- | --- | --- | --- |
| Example 13 | $5 \times 10^9$ | $5 \times 10^4$ | 160 | 3 | 112 | 0 |
| Example 14 | $5 \times 10^9$ | $5 \times 10^4$ | 160 | 6 | 123 | 0 |
| Example 15 | $5 \times 10^9$ | $5 \times 10^4$ | 160 | 2 | 131 | 0 |
| Comparison Example 7 | $1 \times 10^{11}$ | $1 \times 10^6$ | 160 | 1 | 440 | $-0.5$ |
| Comparison Example 8 | $5 \times 10^9$ | $5 \times 10^4$ | 160 | 2 | 690 | $-0.9$ |
| Comparison Example 9 | $5 \times 10^9$ | $5 \times 10^4$ | 140 | 1 | 370 | $-1.1$ |

As is clear from the results shown in Table 4 above, the samples of the examples of this invention show less drop out and excellent RF output characteristics. In the cases of the samples in Comparison Examples 7 to 9, the results are inferior since the balance of the surface free energies of the magnetic layer and the backing layer of each sample are unsuitable. Also, the sample of Comparison Example 9 shows inferior results since the surface glosses are unsuitable although the balance of the surface free energies of the layers are suitable.

What is claimed is:

1. A magnetic recording medium comprising a non-magnetic support having formed thereon a magnetic layer containing a ferromagnetic fine powder, a binder, and carbon black and formed on the opposite side of the non-magnetic support to the magnetic layer-carrying side a backing layer containing a binder and carbon black, wherein the Young's modulus of the magnetic layer is from 600 to 1100 kg/mm$^2$ and the Young's modulus of the backing layer is from 200 to 400 kg/mm$^2$, and wherein the surface electric resistance of the magnetic layer is not higher than $5 \times 10^{10}$ $\Omega$/cm$^2$ and the surface electric resistance of the backing layer is not higher than $1 \times 10^5$ $\Omega$/cm$^2$.

2. The magnetic recording medium as in claim 1, wherein when the thickness of the magnetic layer is A and the thickness of the backing layer is B, $$2.5 \leq (A/B) \leq 4.5$$

and $$3 \ \mu m \leq (A+B) \leq 9 \ \mu m.$$

3. The magnetic recording medium as in claim 1, wherein when the thickness of the magnetic layer is A, the thickness of the backing layer is B, and the thickness of the non-magnetic support is C, $$(A+B) \leq C/2.$$

4. A magnetic recording medium comprising a non-magnetic support having formed thereon a magnetic layer containing a ferromagnetic fine powder, a binder, and carbon black and formed on the opposite side to the non-magnetic support to the magnetic layer-carrying side a backing layer containing a binder and carbon black, wherein the binder of the backing layer comprises (1) a vinyl chloride resin and/or vinyl chloride-vinyl acetate copolymer resin, (2) a polyurethane resin and (3) polyisocyanate in a ratio by weight percent of 45 to 55:15 to 25:20 to 35, and wherein the gloss of the magnetic layer is at least 150, and the gloss of the backing layer is from 2 to 7, and wherein the surface free energy of the magnetic layer is from 40 to 55 dyn/cm and the surface electric resistance of the magnetic layer is not higher than $5 \times 10^{10}$ $\Omega$/cm$^2$, and wherein the surface free energy of the backing layer is from 45 to 60 dyn/cm and at least 1 dyn/cm higher than the surface free energy of the magnetic layer, and the surface electric resistance of the backing layer is not higher than $1 \times 10^5$ $\Omega$/cm$^2$.

5. The magnetic recording medium as in claim 1, wherein the binder of the magnetic layer comprises (1) a vinyl chloride resin and/or a vinyl chloride-vinyl acetate copolymer resin, (2) a polyurethane resin and (3) polyisocyanate in a ratio by weight percent of 20 to 55:15 to 70:10 to 40.

6. The magnetic recording medium as in claim 5, wherein the Young's modulus of the vinyl chloride resin and/or vinyl chloride-vinyl acetate copolymer resin is from 150 to 350 kg/mm$^2$ and the Young's modulus of the polyurethane resin is from 1 to 70 kg/mm$^2$.

7. The magnetic recording medium as in claim 1, wherein the binder for the backing layer comprises (1)

a phenoxy resin and/or a phenol resin, (2) a polyurethane resin and/or an epoxy resin and (3) polyisocyanate and the ratio of these resins is 20 to 50:40 to 70:10 to 40 by weight.

8. The magnetic recording medium as in claim 7, wherein the Young's modulus of the phenoxy resin and/or the phenol resin is from 150 to 350 kg/mm$^2$ and the Young's modulus of the polyurethane resin and/or the epoxy resin is from 1 to 70 kg/mm$^2$.

* * * * *